(12) United States Patent
Akiyoshi (10) Patent No.: US 8,237,628 B2
(45) Date of Patent: Aug. 7, 2012

(54) VECTOR IMAGE DRAWING CIRCUIT AND METHOD FOR VECTOR IMAGE DRAWING

(75) Inventor: Kenji Akiyoshi, Osaka (JP)

(73) Assignee: NEC System Technologies, Ltd., Osaka (JP)

(*) Notice: Subject to any disclaimer, the term of this patent is extended or adjusted under 35 U.S.C. 154(b) by 1073 days.

(21) Appl. No.: 12/216,177

(22) Filed: Jun. 30, 2008

(65) Prior Publication Data
US 2009/0066699 A1     Mar. 12, 2009

(30) Foreign Application Priority Data
Jun. 28, 2007    (JP) .............................. P2007-171286

(51) Int. Cl.
*G09G 1/10*     (2006.01)
(52) U.S. Cl. ......................................... 345/16; 345/441
(58) Field of Classification Search .................. None
See application file for complete search history.

(56) References Cited

U.S. PATENT DOCUMENTS

| | | | | |
|---|---|---|---|---|
| 5,341,472 A * | 8/1994 | Leak | | 345/545 |
| 5,355,449 A * | 10/1994 | Lung et al. | | 345/467 |
| 5,553,219 A * | 9/1996 | Kurashige | | 345/170 |
| 5,706,479 A | 1/1998 | Winner et al. | | |
| 5,729,672 A | 3/1998 | Ashton | | |
| 5,821,944 A * | 10/1998 | Watkins | | 345/582 |
| 5,936,642 A | 8/1999 | Yumoto et al. | | |
| 6,008,820 A | 12/1999 | Chauvin et al. | | |
| 6,148,139 A * | 11/2000 | Cookson et al. | | 386/243 |
| 6,778,177 B1 * | 8/2004 | Furtner | | 345/544 |
| 2006/0193527 A1 * | 8/2006 | Kalva et al. | | 382/239 |
| 2007/0132772 A1 | 6/2007 | Morphet | | |

FOREIGN PATENT DOCUMENTS

| | | |
|---|---|---|
| EP | 1424653 A2 | 6/2004 |
| JP | 03-168694 | 7/1991 |
| JP | 03-233689 | 10/1991 |
| JP | 06-161420 | 6/1994 |

OTHER PUBLICATIONS

A high-speed character contour-fill method using an edge-flag list, Nakashima et al., 1994.*
A parallel algorithm for polygon rasterization, Pineda, 1988.*
Roger D. Hersch et al., Multiprocessor Raster Plotting, IEEE Computer Graphics and Applications, Jul. 12, 1992, No. 4, pp. 79-87.
J. D. Foley et al., Computer Graphics: Principles and Practice, Passage, Computer Graphics, Principles and Practice Reading, Jan. 1, 1996, pp. 92-110, 124-127, 471-476, 882-902.

* cited by examiner

*Primary Examiner* — Ulka Chauhan
*Assistant Examiner* — Phong Nguyen
(74) *Attorney, Agent, or Firm* — Foley & Lardner LLP (57) ABSTRACT

A vector image drawer comprises: an outline definer, a divider, an outline flag setter, a filler, and a continue flag setter. The outline definer defines outline data for indicating a start pixel and an end pixel of a filling along each scanning line of a drawing region. The divider divides the drawing region into an m×n matrix of drawing subregions. The outline flag setter sets an outline flag for indicating a presence of the outline data for each of the drawing subregions. The filler performs a fill processing for drawing subregions in a case where a continue flag is set for an adjacent drawing subregions and the outline flag is set for each of the drawing subregions. A continue flag setter sets the continue flag for each of the scanning line, whether a filling continues into an adjacent drawing subregion.

6 Claims, 10 Drawing Sheets

| COMMAND |
|---|
| SEGMENT=10 |
| Line |
| (3, 1) |
| (3, 5) |
| (5, 11) |
| (6, 11) |
| (7, 8) |
| (12, 8) |
| (13, 11) |
| (14, 11) |
| (16, 5) |
| (16, 1) |
| END |

OUTLINE

FIG. 4A

OUTLINE DATA

REGION WHERE OUTLINE FLAG IS "0"

REGION WHERE OUTLINE FLAG IS "1"

OUTLINE DATA

FIG. 4B

OUTPUT IMAGE

FIG. 4C

FIG. 5C PROCESSING RESULTS

FIG. 5B OUTLINE DATA

FIG. 5A SCANNING ORDER OF THE DRAWING SUBREGION

REGION WHERE OUTLINE FLAG IS "0"

REGION WHERE OUTLINE FLAG IS "1"

OUTLINE DATA

CASE WHERE DRAWING PROCESSING IS OMITTED

FIG. 6A

CASE WHERE DRAWING PROCESSING IS NOT OMITTED

VECTOR IMAGE DRAWING CIRCUIT AND METHOD FOR VECTOR IMAGE DRAWING

BACKGROUND OF THE INVENTION

1. Field of the Invention

The present invention relates to a drawing circuit and a method for drawing for displaying a vector image.

2. Description of the Related Art

Image data displayed on a display device includes raster data that stores information for each of a plurality of pixels arranged in two dimensions and vector data that stores line information.

Raster data includes color and luminance data for each pixel. Vector data includes, for example, data such as a start point and an end point of a line segment, a combination of orders of functions and points for defining a curve, and data for specifying an arc.

Generally, images made from raster data are called raster images, and images made from vector data are called vector images.

In the case where a raster image is enlarged and displayed, each pixel unit is enlarged and displayed without a calculation, and therefore the roughness of the image is highly visible. On the other hand, in the case where a vector image is enlarged and displayed, a calculation is performed according to the resolution, and therefore a smooth image is displayed. For example, an outline font is an example of a group of typeface characters (also known as a font) that stores vector data and produces a smooth display when enlarged or reduced.

For example, Japanese Published Unexamined Patent Application No. H03-168694 discusses the following technology as a method for reducing the conversion time of an outline font. An outline font conversion method for converting outline font data having outline coordinates of character symbols, etc. that are subdivided into a plurality of compositional elements and stored as such into dot data, comprises: a vector converter for converting outline font data into memory as outline dot data for each compositional element unit; a detector for detecting a maximum and a minimum coordinate for each of the compositional elements converted by the vector converter; and an area filler for performing an area fill only for a region enclosed by the maximum and the minimum coordinates.

According to the discussed technology recited above, the filling circuit for drawing an image performs a fill processing only for outline data. Therefore, a drawing region is not specified, and it was necessary to scan all of the outline data of the drawing region.

It is necessary to initialize all of the outline data in the region to scan all of the outline data of the drawing region. Moreover, even for a region not necessary for drawing, the outline data is read; and therefore the number of unnecessary memory accesses increases, which causes a decrease in performance, i.e., a decrease of the drawing speed.

SUMMARY OF THE INVENTION

Accordingly, an object of the present invention is to provide a vector image drawing circuit and a method for performing a high-speed fill processing for drawing a vector image.

To achieve the objects recited above, a vector image drawing circuit according to a first aspect of the present invention comprises:

an outline definer for defining, based on vector data, data for indicating a start pixel for starting a filling and an end pixel for ending the filling along each scanning line of a drawing region;

a divider for dividing the drawing region into an m×n matrix of a plurality of drawing subregions having m rows and n columns, where each of m and n is any natural number;

an outline flag setter for setting an outline flag for each of the drawing subregions in the case where at least one of the start pixel and the end pixel is present in the respective drawing subregion, the outline flag indicating, for respective drawing subregion, a presence of at least one of the start pixel and the end pixel;

a filler for performing a fill processing for each of the drawing subregions, in a case where at least one continue flag is set for an adjacent drawing subregion having previously undergone a fill processing, based on the continue flag set for the adjacent drawing subregion and for each of the drawing subregions to which the outline flag is set, based on the start pixel and the end pixel thereof, the continue flag for indicating, for each scanning line of each of the drawing subregions, whether a filling continues into an adjacent drawing subregion; and a continue flag setter for setting the continue flag for each of the scanning lines of the drawing subregions on which a filling process is performed and the filling process continues into an adjacent drawing subregion that subsequently undergoes a fill processing.

To achieve the objects recited above, a method for vector image drawing according to a second aspect of the present invention comprises:

an outline definition step of defining, based on vector data, data for indicating a start pixel for starting a filling and an end pixel for ending the filling along each scanning line of a drawing region;

a division step of dividing the drawing region into an m×n matrix of a plurality of drawing subregions having m rows and n columns, where each of m and n is any natural number;

an outline flag setting step of setting an outline flag for each of the drawing subregions in the case where at least one of the start pixel and the end pixel is present in the respective drawing subregion;

a filling step of performing a fill processing for each of the drawing subregions, in a case where at least one continue flag is set for an adjacent drawing subregion having previously undergone a fill processing, based on the continue flag set for the adjacent drawing subregion and for each of the drawing subregions to which the outline flag is set, based on the start pixel and the end pixel thereof; and a continue flag setting of setting the continue flag for each of the scanning lines of the drawing subregions on which a filling process is performed and the filling process continues into an adjacent drawing subregion that subsequently undergoes a fill processing.

DETAILED DESCRIPTION OF THE PREFERRED EMBODIMENTS

Hereinafter, an exemplary embodiment of the present invention is described in detail with reference to the drawings. In the drawings, identical or corresponding portions have the same reference numerals. In this exemplary embodiment, a drawing circuit for converting vector data to image memory for displaying a vector image on an all-purpose display device is described. The drawing circuit may be used also in the case where a vector image is printed using a printer, etc.

Figure 1:
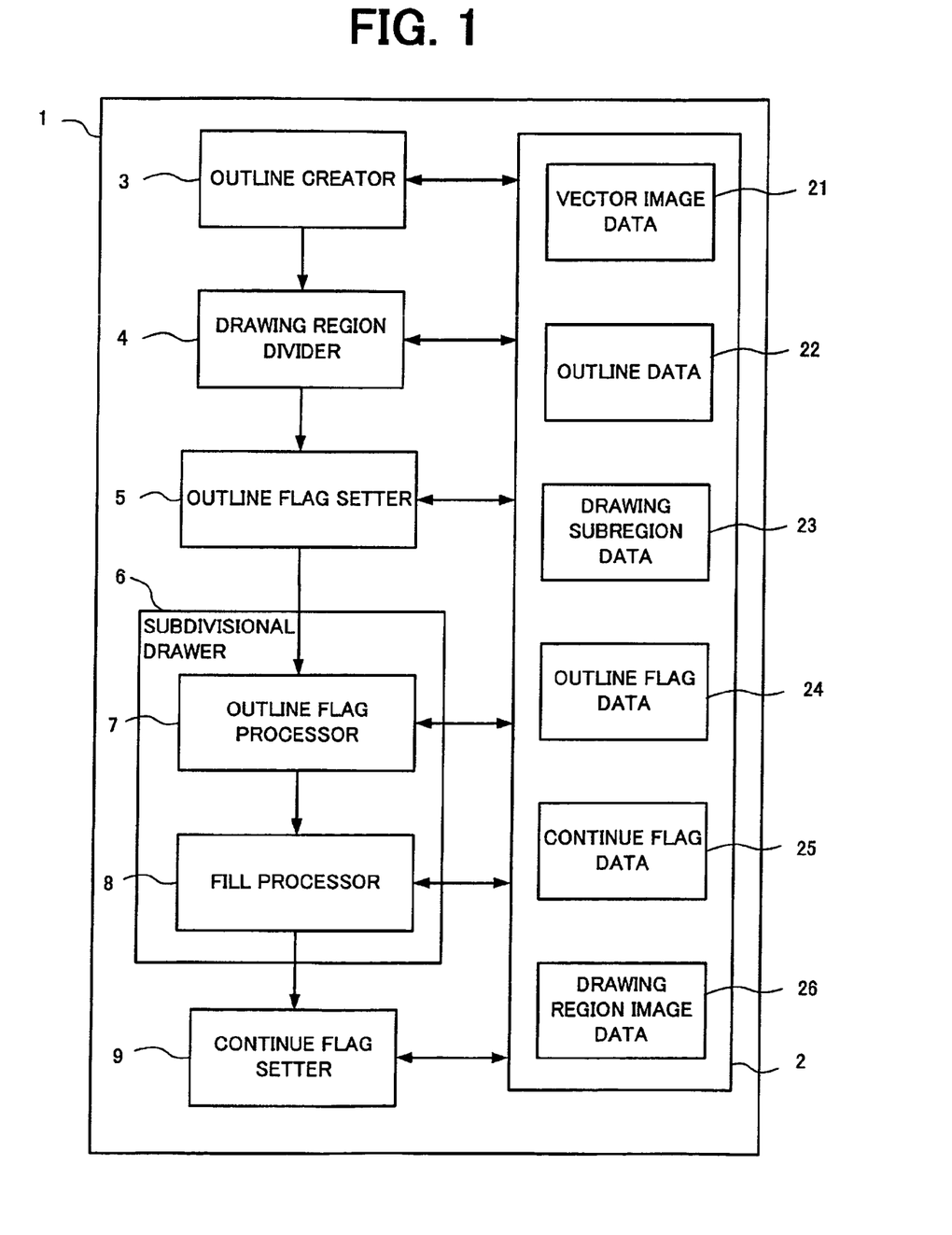
FIG. 1 is a block diagram illustrating an example of a configuration of a vector image drawing circuit according to an exemplary embodiment of the present invention.

FIG. 1 is a block diagram illustrating an example of a configuration of a vector image drawing circuit 1 according to the exemplary embodiment of the present invention.

The vector image drawing circuit 1 includes an image data memory 2, an outline creator 3, a drawing region divider 4, an outline flag setter 5, a subdivisional drawer 6, and a continue flag setter 9. The subdivisional drawer 6 includes an outline flag processor 7 and a fill processor 8.

The image data memory 2 stores vector image data 21, outline data 22, drawing subregion data 23, outline flag data 24, continue flag data 25, and drawing region image data 26.

The vector image data 21 includes data of one or more figures configured by vector data. Figures included in the vector image data 21 are configured by one or more vector data. The vector data may include straight lines, Bezier curves, arcs, etc.

Figure 3:
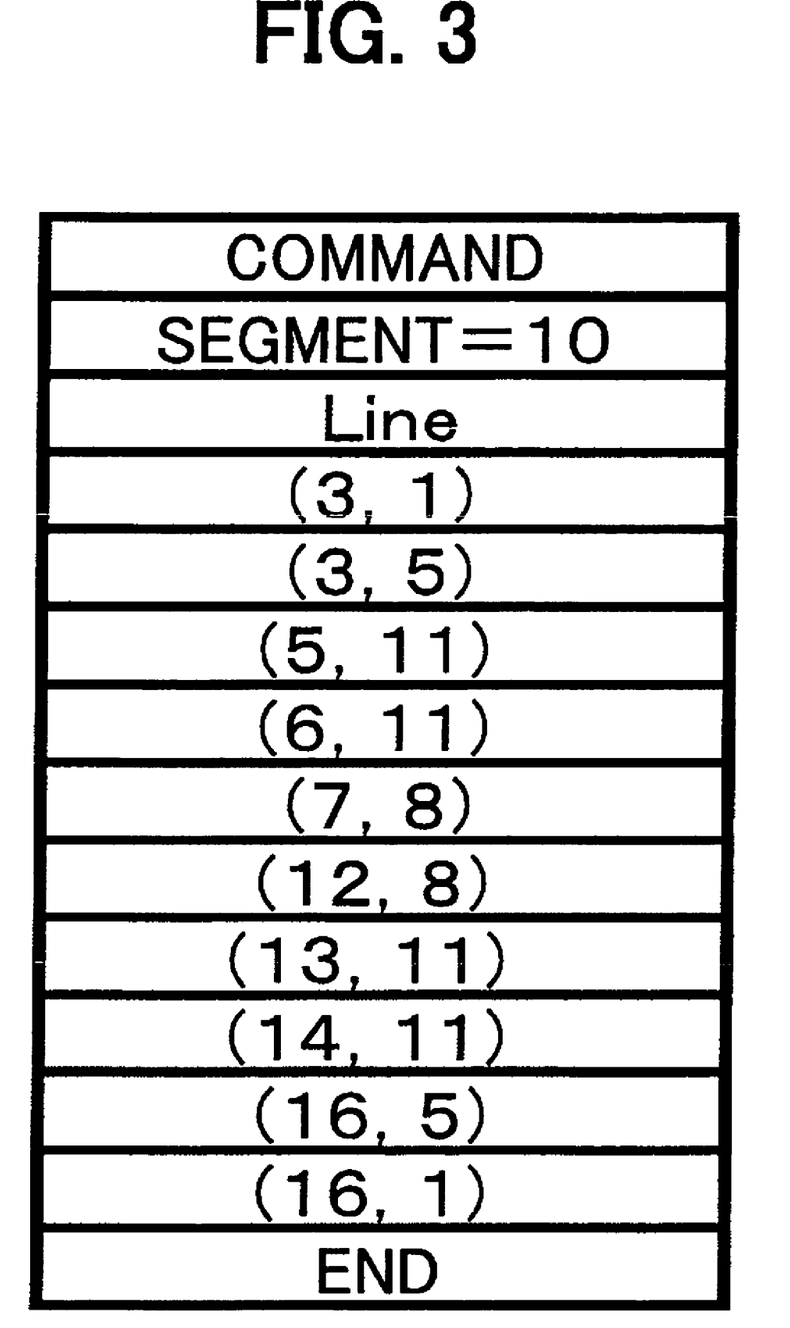
FIG. 3 illustrates an example of vector image data.

FIG. 3 is an example of the vector image data 21 and illustrates one figure configured by vector data. "Segment=10" indicates that the figure is configured by ten components, i.e., vectors. The "Line" listed next indicates that the vectors are line segments. The start point of the line is the coordinate (3, 1). The coordinates of the remaining control points follow, ending with the point having a coordinate of (16, 1). For the example of FIG. 3, there are ten vectors, and therefore the ending point (16, 1) has a line segment to the start point (3, 1), thereby forming a closed figure.

Once again referring to FIG. 1, the outline creator 3 reads the vector image data 21 from the image data memory 2 and defines the outline data 22 corresponding to pixels forming the outline of the figure.

In particular, the outline creator 3 defines the outline data 22 as pixels corresponding to an outline of the figure of the vector image data 21 and stores the outline data 22 in the image data memory 2. The outline data 22 is represented by, for example, "+1" for a start pixel, "−1" for an end pixel, and "0" for other pixels.

Figure 4A:
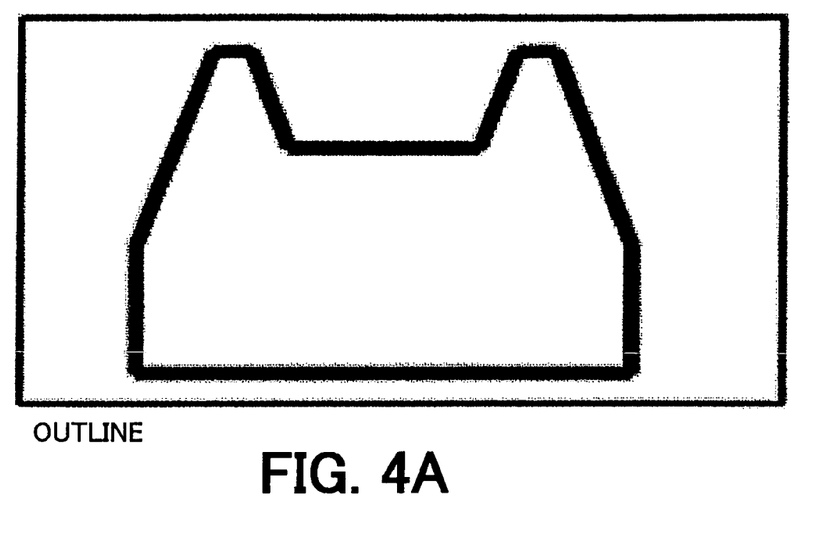
FIGS. 4A to 4C illustrate outline data made from the vector data illustrated in FIG. 3.
Figure 4B:
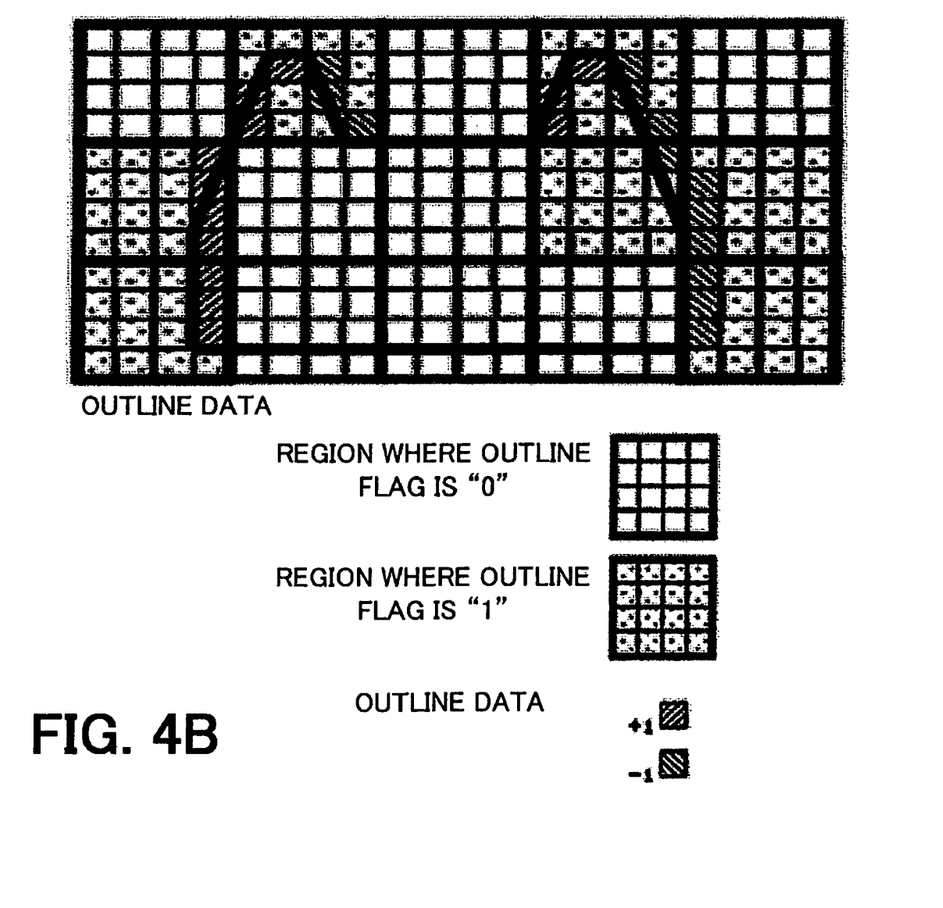

FIG. 4A and FIG. 4B illustrate a processing by the outline creator 3. FIG. 4A illustrates an outline made from the vector image data 21 illustrated in FIG. 3. FIG. 4B illustrates the outline data 22 made corresponding to the outline of FIG. 4A. The outline data 22 is defined for each of the pixels having a hatching in FIG. 4B. In FIG. 4B, start pixels are pixels having a hatching that slants to the upper right, and end pixels are pixels having a hatching that slants to the lower right.

The drawing region divider 4 divides a drawing region into a plurality of drawing subregions having a predetermined size. For example, a drawing subregion size is defined as a rectangle having a predetermined number of pixels in the vertical and horizontal directions, such that the drawing region is divided into an m×n matrix of drawing subregions. In the case where the size of the drawing region is smaller than the predetermined drawing subregion, the drawing region is defined as one drawing subregion. FIG. 4B illustrates an example of a drawing region divided into drawing subregions. In FIG. 4B, thick solid lines enclosing a matrix of 4×4=16 pixels indicate each drawing subregion. Each drawing subregion has the same size and a shape that is uniform over the drawing region. In the example of FIG. 4B, the drawing region is divided into a 3×5 matrix of drawing subregions.

Natural numbers m and n may be provided to the drawing region subdivider 4, and the drawing region may be divided into an m×n matrix of drawing subregions. The size of the drawing subregion need not be uniform over the entire drawing region. For example, the sizes may be varied, such as small drawing subregions in areas of dense figures and large drawing subregions in areas of sparse figures. The drawing region divider 4 stores data illustrating each of the drawing subregions after the division in the image data memory 2 as the drawing subregion data 23.

The outline flag setter 5 determines, for each of the drawing subregions, whether or not a start pixel or an end pixel is present in a drawing subregion. The outline flag setter 5 sets an outline flag for the drawing subregion in the case where a start pixel or an end pixel is present in the drawing subregion. For example, the outline flag is "1" for a drawing subregion having a start pixel or an end pixel, and the outline flag is "0" for a drawing subregion having none thereof.

An example of outline flags set by the outline flag setter 5 is illustrated in FIG. 4B. In FIG. 4B, a start pixel or an end pixel is present in the drawing subregions having a cross hatching; the outline flag setter 5 sets the outline flag to "1" for the drawing subregions having the cross hatching. Drawing subregions having no start pixels and no end pixels are indicated by regions having no cross hatching in FIG. 4B, and the outline flag for the drawing subregion is not set (for example, the outline flag is set as "0").

The outline flag setter 5 stores, for each of the drawing subregions, data coupled with the outline flag in the image data memory 2 as the outline flag data 24.

Figure 4C:
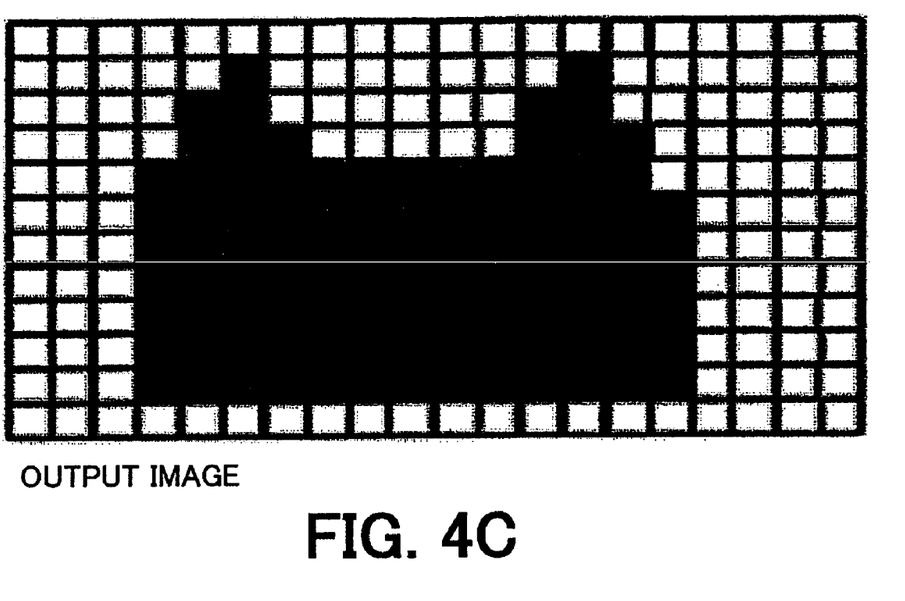

The subdivisional drawer 6 performs, for each of the drawing subregions, fill processing based on the outline data 22. For example, as illustrated in FIG. 4C, the interior pixels of the profile are filled by a fill processing.

Figure 5A:
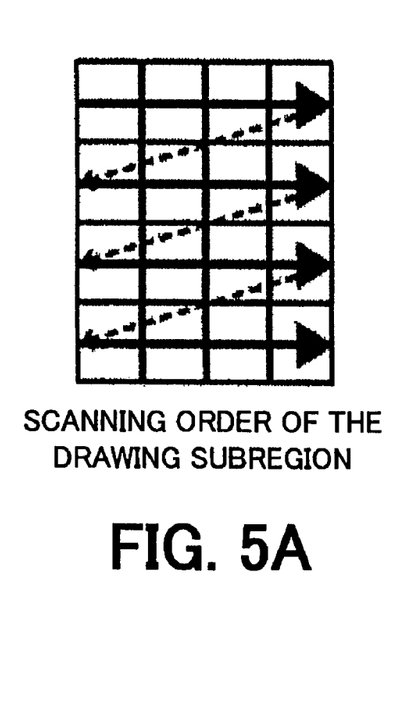
FIGS. 5A to 5C illustrate a fill processing for one drawing subregion.
Figure 5B:
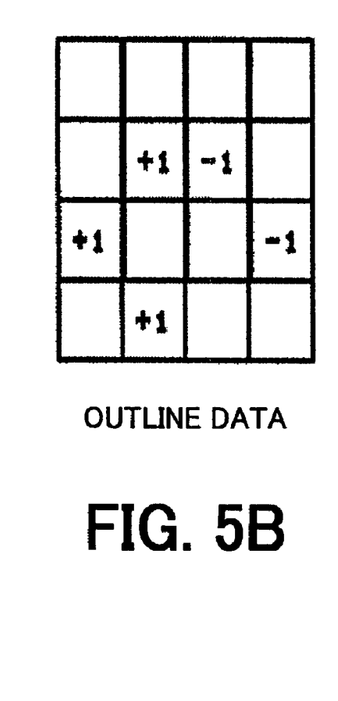
Figure 5C:
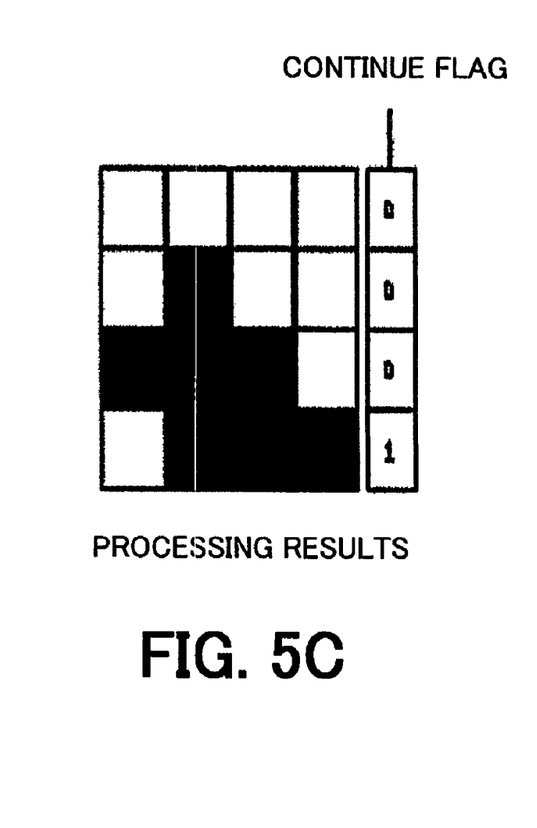

Now, a fill processing by the subdivisional drawer 6 is described with reference to FIGS. 5A to 5C. In FIGS. 5A to 5C, one drawing subregion and the pixels inside of the drawing subregion are illustrated.

The subdivisional drawer 6 performs a filling of the pixels by scanning the outline data defined for the pixels inside the drawing subregion, thereby performing the fill processing. In particular, as illustrated in FIG. 5A, the subdivisional drawer 6 scans pixels from the left edge of a row of pixels toward the right edge, and upon scanning the right edge of the row of pixels, continues scanning once again from the left edge of the row of pixels below. Hereinafter, one row of pixels of a drawing subregion from the left edge through the right edge is referred to as a scanning line.

The fill processing starts filling pixels from a start pixel indicated by "+1" in FIG. 5B. Then, pixels are filled in the scanning direction. The filling ends when an end pixel (indicated by "−1" in FIG. 5B) is encountered during the scanning. In the case where no end pixel is encountered in the row of pixels, i.e., scanning line, of the drawing subregion being filled, the pixels of the scanning line through the pixel at the right edge are filled. In such a case, the continue flag setter 9 sets the continue flag of the scanning line to "1".

The continue flag setter 9 sets a continue flag for each of the scanning lines and stores the resulting continue flags in the image data memory 2 as the continue flag data 25.

The results of the fill processing based on the outline data illustrated in FIG. 5B are illustrated in FIG. 5C. The scanning line of the first row of pixels has no start pixel and no end pixel, and therefore no filling is performed. The scanning lines of the second row of pixels and the third row of pixels perform a filling from a start pixel to an end pixel. The scanning line of the fourth row of pixels encounters only a start pixel, and therefore performs a filling from the start pixel through the last pixel in the row of pixels and sets a continue flag.

Figure 6A:
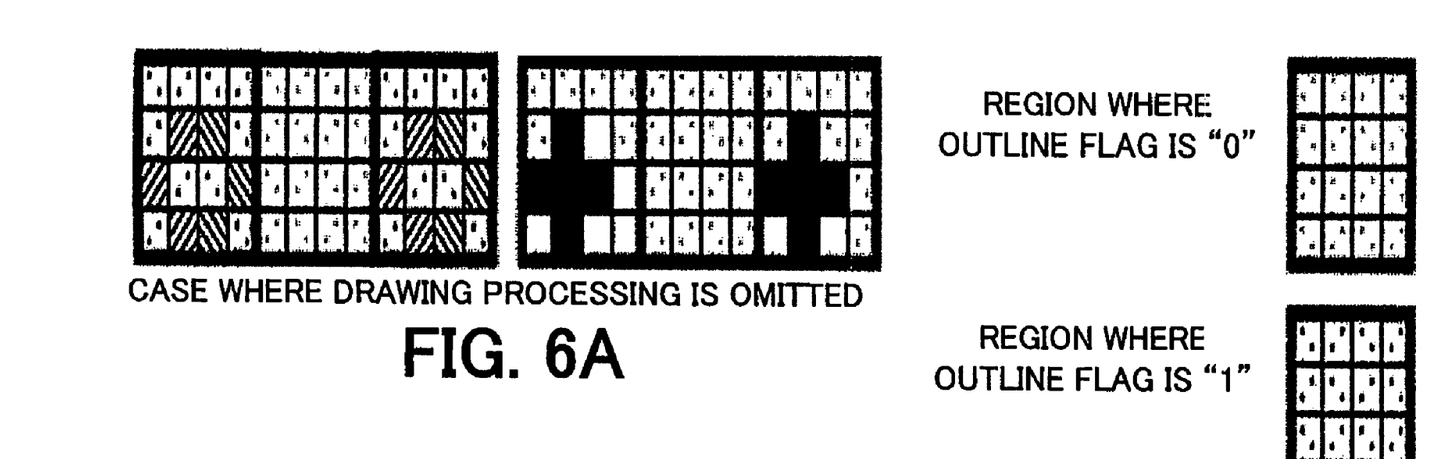
FIGS. 6A to 6B illustrate a filling of a plurality of connecting drawing subregions.
Figure 6B:
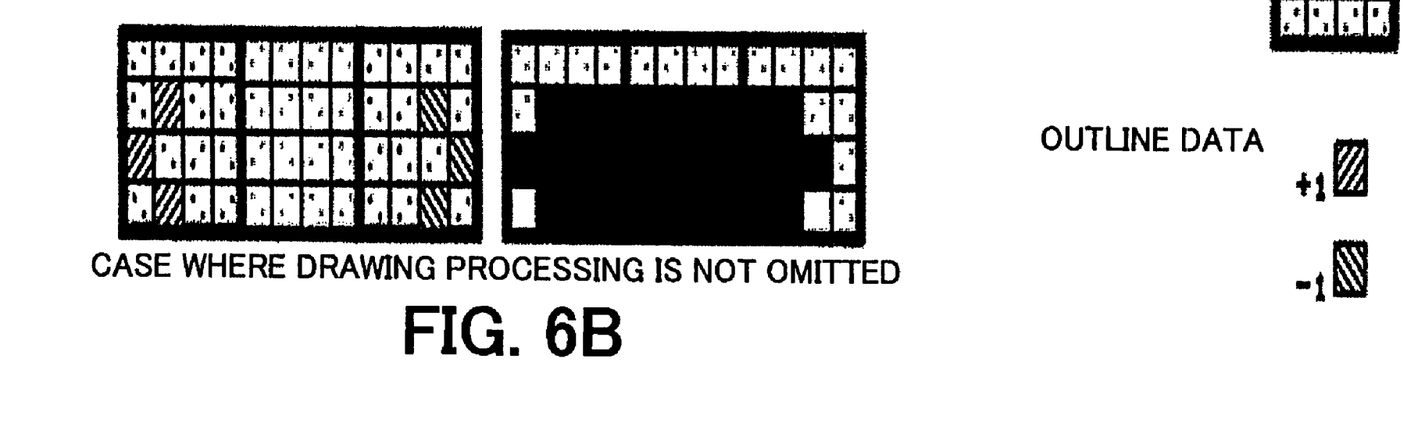

Next, a fill processing of a plurality of connecting drawing subregions is described with reference to FIGS. 6A and 6B. In FIG. 6A, the center drawing subregion of the three adjacent drawing subregions illustrates the case where a fill processing is omitted. FIG. 6B illustrates the case where the drawing processing of the center drawing subregion is not omitted. In FIGS. 6A and 6B, start pixels of the outline data are represented by hatching that slants to the upper right, and end pixels are represented by hatching that slants to the lower right.

For both FIG. 6A and FIG. 6B, no outline data exists for the center drawing subregions, and therefore outline flags are not set. Outline data exists for the drawing subregions on the left and the right sides, and therefore the corresponding outline flags are set.

In FIG. 6A, the drawing processing for the leftmost drawing subregion results in no continue flags being set for any of the scanning lines. Therefore, a fill processing is not necessary for the center drawing subregion. In addition, no continue flags are set for the center drawing subregion. In the rightmost drawing subregion, new start pixels are encountered, and a corresponding filling is performed.

In FIG. 6B, the drawing processing of the leftmost drawing subregion results in the continue flag setter 9 setting continue flags for the scanning lines of the second through fourth rows of pixels. Thus, a fill processing is performed for the center drawing subregion. The center drawing subregion has no outline data, and namely no end pixels, and therefore the subdivisional drawer 6 fills the scanning lines from the first pixel through the last pixel for the scanning lines having a continue flag set in the leftmost drawing subregion. At this time, the continue flag setter 9 sets continue flags for scanning lines of the center drawing subregion for which filling was performed, to be used in the next drawing subregion.

Regarding the rightmost drawing subregion of FIG. 6B, several continue flags have been set for the adjacent center drawing subregion, and therefore the scanning lines corresponding to set continue flags undergo a filling from the first pixel. For these scanning lines, a start pixel cannot be present prior to an end pixel. In the case where an end pixel is encountered, the filling continues up to but not including that pixel, and in the case where an end pixel is not encountered, filling continues through the last pixel of the scanning line. In the case where the filling is performed through the last pixel, the continue flag setter 9 sets the continue flag of the scanning line to "1".

The outline flag processor 7 determines an outline flag for each of the drawing subregions. The fill processor 8 performs a fill processing for each of the drawing subregions based on the outline data and the continue flags. Once again referring to FIG. 1, the subdivisional drawer 6 stores the image of the entire drawing region drawn for each of the drawing subregions in the image data memory 2 as the drawing region image data 26.

Figure 2:
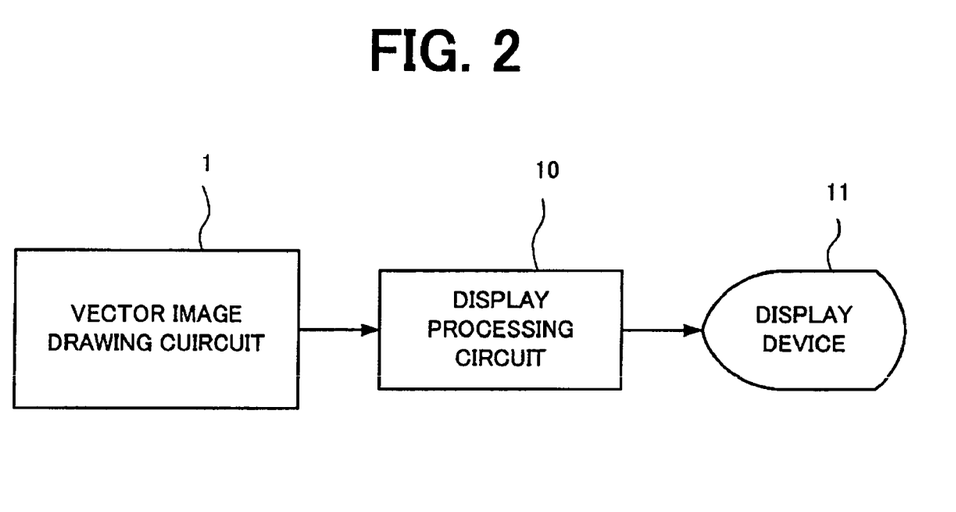
FIG. 2 is a block diagram illustrating an example of a configuration of a display system using the vector image drawing circuit.

FIG. 2 is a block diagram illustrating an example of a display system using the vector image drawing circuit 1. The display system comprises, for example, the vector image drawing circuit 1, a display processing circuit 10, and a display device 11. The display processing circuit 10 is connected to the vector image drawing circuit 1 and the display device 11. The display processing circuit 10 reads the drawing region image data 26 created by the vector image drawing circuit 1 and displays the drawing region image data 26 on the display device 11.

Thus, according to the vector image drawing circuit 1 of the present invention, a vector image is drawn by setting, for each of the drawing subregions, the outline flag data 24 and the continue flag data 25, and determining thereby the necessity of filling each of the drawing subregions; and therefore ineffective fill processing can be omitted. Furthermore, the outline data definition processing and the scanning of the outline flags and the continue flags can be performed in parallel, thereby efficiently performing the fill processing.

The vector image drawing circuit 1 according to the present invention may be configured from electronic circuits including hardware for implementing circuits such as LSI (Large Scale Integration) having embedded circuits for realizing functions for drawing the vector images recited above. Furthermore, the vector image drawing circuit 1 may be realized as functions of software by executing a vector image drawing program for performing the functions recited above with devices such as a digital signal processor (DSP: Digital Signal Processor). In such a case, the vector image drawing program stored in ROM (Read Only Memory), etc. of the DSP is executed, and the operation of each component is controlled to perform the functions recited above, thereby realizing with software the vector image drawing circuit 1.

Now, operations of the vector image drawing circuit 1 according to this exemplary embodiment are described with reference to FIG. 7 through FIGS. 9A to 9G.

Figure 7:
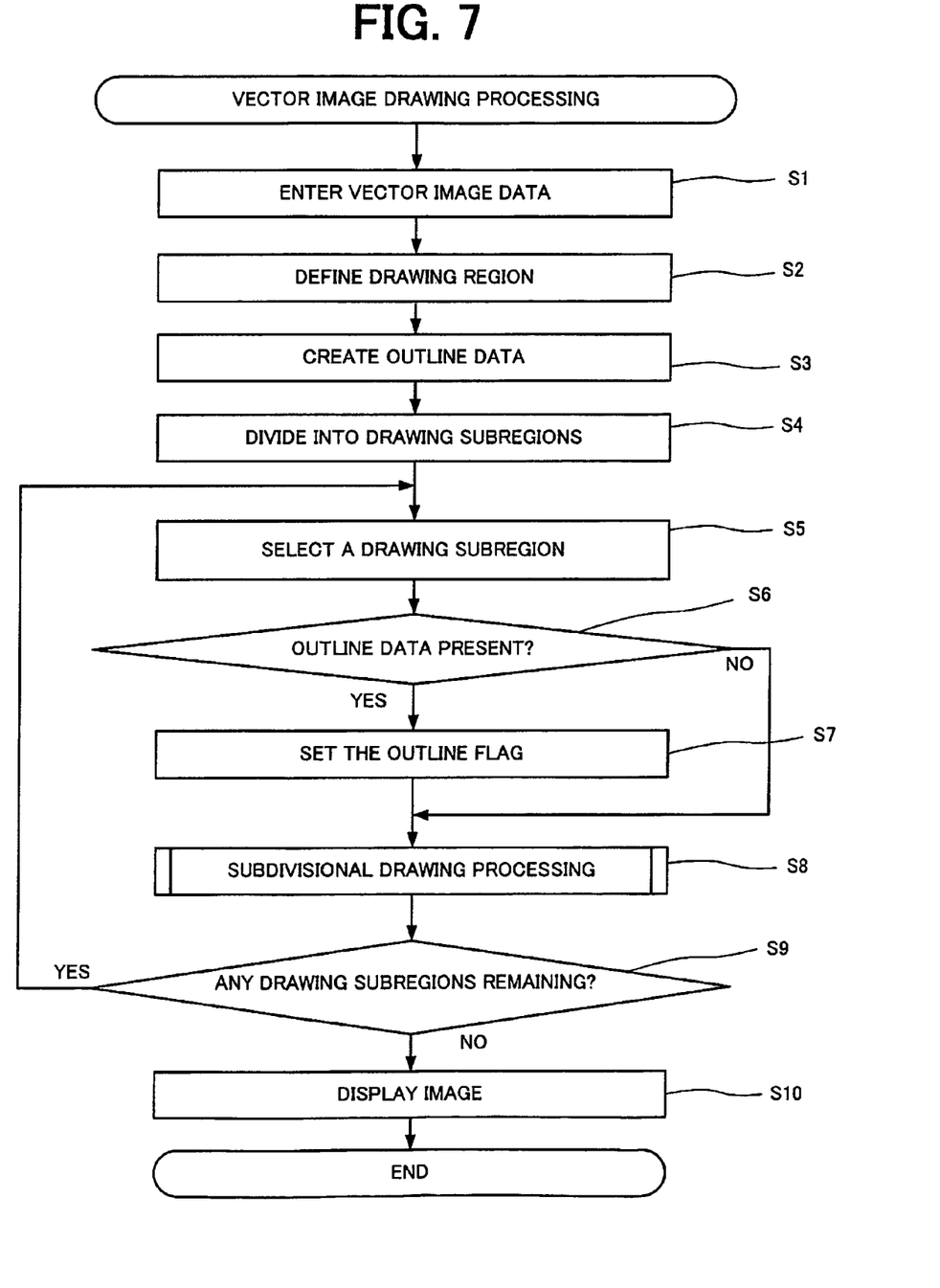
FIG. 7 is a flowchart illustrating an example of an operation of the vector image drawing circuit according to the exemplary embodiment of the present invention.

FIG. 7 is a flowchart illustrating an example of an operation of the vector image drawing circuit 1 according to the exemplary embodiment of the present invention. The vector image drawing circuit 1 stores the vector image data 21 in the image data memory 2 (step S1). The vector image drawing circuit 1 defines a drawing region, for example, based on instructions from an operator (step S2). The drawing region is a predetermined region of an image to be displayed on the display device 11, including a portion or an entirety of vector image data.

Then, the outline creator 3 creates the outline data 22 corresponding to an outline from the vector image data 21 stored in the image data memory 2 and stores the outline data 22 in the image data memory 2 (step S3). The drawing region divider 4 divides the drawing region into drawing subregions by a predetermined method (step S4). As recited above, the method for dividing, for example, may divide the drawing region into a plurality of drawing subregions of a predetermined size. Alternatively, the drawing region may be divided into an m×n matrix of drawing subregions. Preferably, each of the drawing subregions has uniform sizes over the entire drawing region.

Then, the outline flag setter 5 selects one drawing subregion after the division (step S5) and discriminates whether or not the outline data 22 is present in the selected drawing subregion (step S6). In the case where a start pixel or an end pixel is present (step S6: YES), the outline flag setter 5 sets the outline flag for the drawing subregion (step S7). In the case where outline data is not present (step S6: NO), the outline flag setter 5 does not set the outline flag for the drawing subregion. Then, the subdivisional drawer 6 performs a subdivisional drawing processing (step S8).

Figure 8:
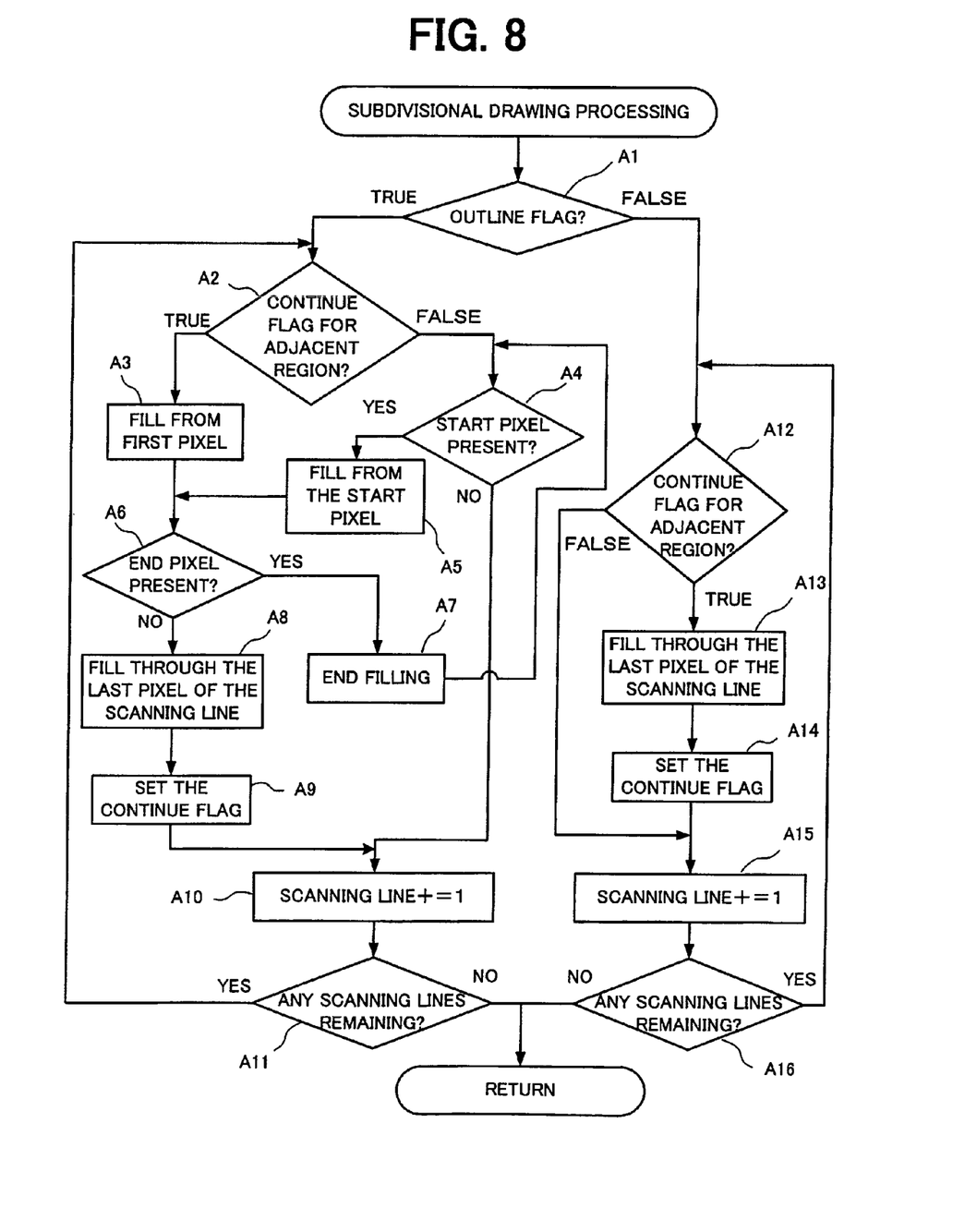
FIG. 8 is a flowchart illustrating an example of an operation of a subdivisional drawing processing.

FIG. 8 is a flowchart illustrating an example of an operation of the subdivisional drawing processing. The flowchart of FIG. 8 illustrates details of the processing of step S8 illustrated in FIG. 7.

The subdivisional drawer 6 discriminates whether or not the outline flag is set for the selected drawing subregion (step A1). In the case where the outline flag is set (step A1: TRUE), it is discriminated whether or not the continue flag is set for the scanning line of the previously processed adjacent drawing subregion corresponding to the first scanning line (step A2).

In the case where the continue flag is set (step A2: TRUE), a filling is started from the first pixel of the scanning line (step A3). In the case where the continue flag is not set (step A2: FALSE), it is verified whether a start pixel is present in the scanning line (step A4). In the case where a start pixel is present (step A4: YES), the filling is started from the start pixel (step A5). In the case where no start pixel is present (step A4: NO), the flow proceeds to the next scanning line (step A10).

In the case where a filling is started (step A3 or step A5), it is discriminated whether or not an end pixel is present in the scanning line (step A6). In the case where an end pixel is present (step A6: YES), the filling is ended at the end pixel, i.e., without filling the end pixel (step A7). It is then determined whether any more start pixels are present (step A4). In the case where no more start pixels are present (step A4: NO), the flow proceeds with the next scanning line (step A10).

In the case where no end pixel is present in the scanning line (step A6: NO), the filling proceeds through the last pixel of the scanning line (step A8), and the continue flag setter 9 sets the continue flag for the scanning line (step A9). Then, the flow proceeds to the next scanning line (step A10). The "+=1" symbol in step A10 represents an increment in the scanning line number.

In the case where an unprocessed scanning line remains in the drawing subregion undergoing the processing (step A11: YES), the flow returns to step A2 and once again discriminates whether or not the continue flag is set in the previously processed adjacent drawing subregion corresponding to the scanning line. In the case where no unprocessed scanning lines remain (step A11: NO), the subdivisional drawing processing ends.

On the other hand, in the case where the outline flag is not set for the drawing subregion undergoing the processing (step A1: FALSE), it is discriminated whether or not the continue flag is set for the previously processed adjacent drawing subregion corresponding to the first scanning line (step A12).

In the case where the continue flag is set (step A12: TRUE), filling is performed from the first pixel through the last pixel of the scanning line (step A13). Then, the continue flag setter 9 sets the continue flag of the scanning line (step A14).

In the case where the scanning line is at least partially filled (step A14), and in the case where the scanning line is not filled (step A12: FALSE), the flow proceeds to the next scanning line (step A15). In the case where an unprocessed scanning line remains in the drawing subregion undergoing the processing (step A16: YES), the flow returns to step A12, and it is once again discriminated whether or not the continue flag is set for the previously processed adjacent drawing subregion corresponding to the scanning line. In the case where no unprocessed scanning lines remain (step A16: NO), the subdivisional drawing processing ends.

Thus, the subdivisional drawing processing for the drawing subregion is ended, and the flow returns to the flowchart of FIG. 7. In the case where unprocessed drawing subregions remain (step S9: YES), the flow returns to step S5, and the outline flag setter 5 once again selects a drawing subregion. In the case where the drawing processing for all of the drawing subregions is completed (step S9: NO), the display processing circuit 10 displays the drawing region image data 26 on the display device 11 (step S10).

Thus, the outline flag data 24 and the continue flag data 25 are set for each of the drawing subregions; the necessity is discriminated thereby for filling the drawing subregion; and ineffective fill processing can be omitted. Furthermore, the outline data definition processing and the scanning of the outline flag and the continue flag can be performed in parallel, thereby efficiently performing the fill processing.

FIGS. 9A to 9G are timing chart illustrating an example of a fill processing. FIGS. 9A to 9G illustrate the fill processing timing of the outline data example of FIG. 4B.

Figures 9A, 9B:
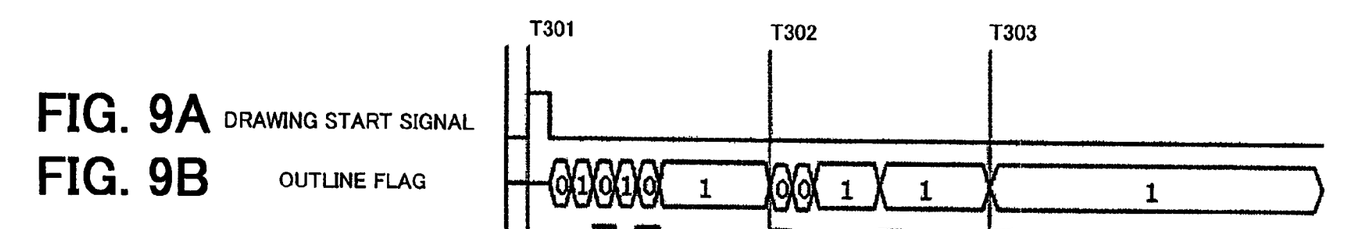
FIGS. 9A to 9G are timing chart illustrating an example of a fill processing.
Figures 9C, 9D, 9E:
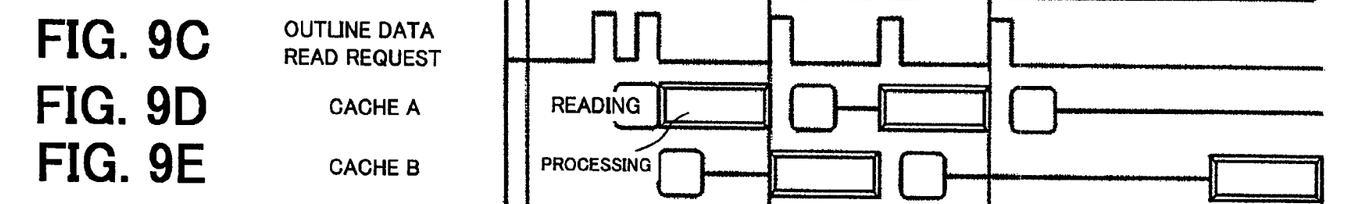

It is assumed, for illustration, that a filling start signal is asserted at a timing T301, and the outline flag data and the outline data are those according to FIG. 4B. The subdivisional drawer 6 scans horizontally from the upper left of the drawing subregion, and therefore the outline flag data is processed in the sequence "01010 10011 10001" as shown in FIG. 9B. At this time, the first digit is "0," and therefore the scanning continues. The second digit is "1", and therefore an outline data read request is asserted as shown in FIG. 9C, and a reading of the outline data is started. In FIG. 9D, the outline data is written in a cache A of the second drawing subregion.

Figures 9F, 9G:
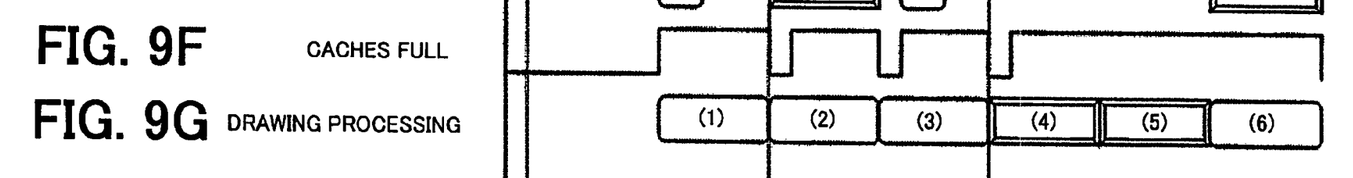

A drawing processing (1) is started after completing the reading of the outline data as shown in FIG. 9G. The outline flag is "0" for the third drawing subregion, and therefore outline data is not read. The outline flag for the fourth drawing subregion is "1", and therefore the outline data is read and written into a cache B. Drawing processing is performed in parallel to the reading of the outline data and the scanning of the outline flag, and therefore the drawing processing (1) ends processing at a timing T302, at which time a reading of outline data is completed for the drawing subregion corresponding to the outline flag of the fourth drawing subregion. At this point, the outline flag is not continuous (the outline flag changes from "0" to "1"), and therefore it is determined whether or not a fill processing is to be continued from the continue flag of the previously processed drawing subregion. In this case, the continue flag is not set, and therefore a drawing processing (2) is performed regardless of the previously processed drawing subregion, thereby performing drawing processing of the fourth drawing subregion of FIG. 4B. The outline flag is "0" for the fifth drawing subregion, and the corresponding continue flags are not set; and therefore the drawing processing is not performed.

Similarly for the outline flag data of the sixth through the ninth drawing subregions, it is determined whether or not an outline flag is present and whether or not the fill processing is to be continued. For the sixth drawing subregion, the outline flag is "1", and therefore the outline data is read in (cache A), and a fill processing is performed by a drawing processing (3). The fill processing of the sixth (leftmost of the second row) drawing subregion continues to the next drawing subregion, and therefore continue flags are set.

The drawing subregions second and third from the left of the second row of FIG. 4B have outline flags of "0", and therefore the outline data is not read. However, the fill processing is to be continued, and therefore drawing processings are performed for each, respectively (drawing processing (4) and (5)).

Upon the completion of the drawing processing (5), the outline data of the ninth drawing subregion, i.e., the fourth from the left of the second row, has already been read in (cache B). Corresponding to this drawing subregion, continue flags are set during the previous drawing subregion, and therefore a fill processing, (drawing processing (6)), is performed until an end pixel is encountered or through the last pixel of the scanning line. Upon scanning all of the outline flags and processing all of the outline data, the processing results illustrated in FIG. 4C are obtained.

The present invention is thus described above by illustration of a preferable exemplary embodiment, but the present invention is not limited by the exemplary embodiment recited above, and the present invention may be implemented with various modifications within the scope of the technical ideas thereof. For example, this exemplary embodiment describes a case where the size of the drawing subregions is uniform over the drawing region, but the present invention may be implemented for cases where the size of the drawing subregion changes.

Furthermore, the configurations of the hardware and the flowcharts recited above are but one example, and any modification or revision can be made.

The central portion of the processing of the vector image drawing circuit 1, which includes the outline creator 3, the drawing region subdivider 4, the outline flag setter 5, and the subdivisional drawer 6, may be realized by using, for example, a DSP (Digital Signal Processor). For example, the vector image drawing circuit 1 for executing the processing recited above may be made by installing a program for executing the operations recited above into a memory of a DSP.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-171286 filed on Jun. 28, 2007 and including specification, claims, drawings and summary. The disclosure of the above Japanese Patent Application is incorporated herein by reference in its entirety.

What is claimed is:

1. A vector image drawing circuit comprising:
    an outline definer configured to define, based on vector data, data for indicating a start pixel for starting a filling and an end pixel for ending the filling along each scanning line of a drawing region;
    a divider for dividing the drawing region into an m×n matrix of a plurality of drawing subregions having m rows and n columns, wherein at least one area of dense figures is divided into drawing subregions which are smaller than drawing subregions for an area having sparser figures than the one area of denser figures, where each of m and n is any natural number;
    an outline flag setter configured to set an outline flag for each of the drawing subregions in the case where at least one of the start pixel and the end pixel is present in the respective drawing subregion, and to not set an outline flag for each of the drawing subregions in the case where a start pixel is not present and an end pixel is not present, the outline flag indicating, for respective drawing subregion, a presence of at least one of the start pixel and the end pixel;
    a filler configured to perform a fill processing for each of the drawing subregions, in a case where at least one continue flag is set for an adjacent drawing subregion having previously undergone a fill processing, based on the continue flag set for the adjacent drawing subregion and for each of the drawing subregions to which the outline flag is set, based on the start pixel and the end pixel thereof, wherein the continue flag indicates, for each scanning line of each of the drawing subregions, whether a filling continues into an adjacent drawing subregion;
    and a continue flag setter configured to set the continue flag for each of the scanning lines of the drawing subregions on which a fill processing is performed and the fill processing continues into an adjacent drawing subregion that subsequently undergoes a fill processing and on which a fill processing is performed through a last pixel of the scanning line, and configured to discriminate whether or not the continue flag is set for the previously processed adjacent drawing subregion corresponding to a first scanning line in the case where the outline flag is not set for the drawing subregion undergoing processing.

2. The vector image drawing circuit according to claim 1, wherein
    the filler, for each scanning line of the drawing subregion undergoing the fill processing, fills from a first pixel through one of a pixel in front of the end pixel and a last pixel of the scanning line in the case where the continue flag is set for the same scanning line of the adjacent drawing subregion having previously undergone a fill processing;
    and fills from the start pixel through one of a pixel in front of the end pixel and a last pixel in each scanning line where the start pixel is present,
    the continue flag setter, for each scanning line of the drawing subregion undergoing the setting, sets the continue flag for the scanning line on which a filling is performed through a last pixel of the scanning line.

3. The vector image drawing circuit according to claim 2, wherein
    the filler excludes the drawing subregion from a target of the filling processing in the case where the continue flag is not set for an adjacent drawing subregion having previously undergone a filling processing and the outline flag is not set for the drawing subregion undergoing the exclusion.

4. A method for drawing a vector image comprising:
    defining, based on vector data, data for indicating a start pixel for starting a filling and an end pixel for ending the filling along each scanning line of a drawing region;
    dividing the drawing region into an m×n matrix of a plurality of drawing subregions having m rows and n columns, wherein at least one area of dense figures is divided into drawing subregions which are smaller than drawing subregions for an area having sparser figures than the one area of denser figures, where each of m and n is any natural number;

setting an outline flag for each of the drawing subregions in the case where at least one of the start pixel and the end pixel is present in the respective drawing subregion, and not setting an outline flag for each of the drawing subregions in the case where a start pixel is not present and an end pixel is not present;

discriminating whether or not the continue flag is set for the previously processed adjacent drawing subregion corresponding to a first scanning line in the case where the outline flag is not set for the drawing subregion undergoing to processing;

performing a fill processing for each of the drawing subregions, in a case where at least one continue flag is set for an adjacent drawing subregion having previously undergone a fill processing, based on the continue flag set for the adjacent drawing subregion and for each of the drawing subregions to which the outline flag is set, based on the start pixel and the end pixel thereof; and setting the continue flag for each of the scanning lines of the drawing subregions on which a fill processing is performed and the fill processing continues into an adjacent drawing subregion that subsequently undergoes a fill processing and on which a fill processing is performed through a last pixel of the scanning line.

5. The method for vector image drawing according to claim 4, wherein performing a fill processing, for each scanning line of the drawing subregion undergoing the fill processing, further fills from a first pixel through one of a pixel in front of the end pixel and a last pixel of the scanning line in the case where the continue flag is set for the same scanning line of the adjacent drawing subregion having previously undergone a fill processing;

and fills from the start pixel through one of a pixel in front of the end pixel and a last pixel in each scanning line where the start pixel is present, the continue flag setting step, for each scanning line of the drawing subregion undergoing the setting, sets the continue flag for the scanning line on which a filling is performed through a last pixel of the scanning line.

6. The method for vector image drawing according to claim 5, wherein performing a fill processing excludes the drawing subregion from a target of the fill processing in the case where the continue flag is not set for an adjacent drawing subregion having previously undergone a fill processing and the outline flag is not set for the drawing subregion undergoing the exclusion.

* * * * *